Patented Oct. 7, 1924.

1,510,472

UNITED STATES PATENT OFFICE.

FREDERICK W. FARRELL, OF BROOKFIELD, MASSACHUSETTS.

ADHESIVE AND SEALING STRIP HAVING A COATING OF THE SAME.

No Drawing. Application filed January 19, 1917, Serial No. 143,404. Renewed February 29, 1924.

*To all whom it may concern:*

Be it known that I, FREDERICK W. FARRELL, a citizen of the United States, residing at Brookfield, in the county of Worcester and State of Massachusetts, have invented a new and Improved Adhesive and Sealing Strip Having a Coating of the Same, of which the following is a specification.

The present invention has reference to an improved adhesive and a sealing or reinforcing strip or member having such adhesive.

The main purpose and object of the present invention is to provide an improved adhesive and material having the same in which, under normal conditions prior to use the adhesive, when spread on paper or other suitable material, may be wound into coils or rolls without sticking or caking but which adhesive readily may be rendered tacky by heat to effect the adhesive attachment of said paper or material to any suitable article or wrapper.

Another object of the invention is to provide an improved adhesive which when applied in use will not be unduly affected by moisture under ordinary conditions.

Other objects of the invention will appear from the following description.

The invention consists in the novel adhesive hereinafter to be described and claimed.

The invention also consists in a sealing strip or member of paper having on its surface adhesive having moisture repelling or resisting quality.

The invention still further consists of material having the novel adhesive applied thereto as a surface coating.

Adhesive of the nature herein referred to is adapted to be used for many and preferably for all of the purposes for which adhesive rendered tacky by moisture may be used. This new adhesive has however advantages not possessed by adhesive rendered tacky by moisture. As the new adhesive is not materially affected by moisture it does not readily deteriorate and as it does not become tacky at ordinary temperatures it can be applied to material or paper and said material or paper can be wound into rolls without danger of the convolutions of said rolls adhering. After the use of this improved adhesive to attach two parts said attachment practically is permanent at ordinary temperatures.

In carrying this invention into practice I take asphalt or a compound in which asphalt predominates and melt the same. I then add to said melted asphalt linseed oil and sulphur, preferably but not necessarily first adding the linseed oil to the melted asphalt and mixing the same and then adding the sulphur and mixing it with the combined asphalt and linseed oil. I next raise the temperature of the mixture to about 185 degrees C., when reaction takes place as is demonstrated by the active frothing of the mixture and the evolution of fumes with the further result that the mixture thickens. The subjection of the above mixture to the temperature of 185 degrees C. causes the sulphur to vulcanize the oil and to produce thereby a rubbery compound in an asphaltic solution thus changing an otherwise sticky and limpid mixture to a tough and elastic one. This heating at 185 degrees C. may be shorter or longer depending on whether a more or less hard compound is desired. When the mixture thus described becomes cooled to atmospheric temperature the product is a strong tenacious rubbery mass which has considerable elasticity.

In the process of manufacturing the new adhesive as above described I prefer to use one hundred twenty (120) parts of the asphalt or asphaltic substance; twenty-six (26) parts of linseed oil, and then (10) parts of sulphur but I have varied these proportions somewhat in some cases depending, among other considerations, upon the temperature at which it is desired to have the adhesive become tacky.

When this improved adhesive is applied to paper or other suitable material and allowed to cool the paper or material can be wound into coils without danger of the adhesive sticking together adjacent coils of said paper or material at normal temperatures and without danger of the adhesive caking. When, however, the adhesive surface of said paper or material is applied to an article, heated and pressed thereagainst, the improved adhesive adheres firmly and cannot become accidentally detached by the presence of moisture at temperatures lower than that at which the adhesive becomes tacky and adapted to be loosened from its adhesion.

Having thus described my invention I claim as new and desire to secure by Letters Patent:

1. An adhesive comprising an asphalt, an oil and sulphur.

2. An adhesive comprising asphalt, linseed oil and sulphur approximately in the proportions named.

3. An adhesive comprising an asphalt, an oil and an agent to assist vulcanization subjected to a temperature to render said agent active.

4. An adhesive comprising an asphalt and an oil vulcanized to a predetermined degree.

5. An adhesive comprising an asphaltum base, a drying oil, and a vulcanizing agent.

6. A flexible sealing strip comprising a strip of paper having intimately secured to and penetrating the surface fibres thereof a moisture resisting, flexible, normally non-adhesive coating containing asphalt, sulphur and an oil, whereby said strip may be adhesively attached to an article by heat applied to the back thereof, and the removal of said strip when subjected to the action of moisture is prevented.

7. A flexible sealing strip comprising a strip of paper, a substantially homogeneous coating of adhesive material intimately attached to the surface fibres of the paper, said material having an asphaltum base and including an oil, and an agent to assist vulcanization, said material being normally non-adhesive and flexible whereby the strip may be rolled up without breaking the paper and without adjacent convolutions adhering to each other and being resistant to moisture but adapted to be rendered tacky by the application of heat, whereby the strip may be adhesively secured to an article by heat applied to the back of said strip and the removal of said strip when subjected to moisture is prevented.

FREDERICK W. FARRELL.